United States Patent
Okuno

[11] Patent Number: 6,144,488
[45] Date of Patent: Nov. 7, 2000

[54] OPTICALLY AMPLIFYING DEVICE WITH GAIN EQUALIZING FUNCTION

[75] Inventor: Hideki Okuno, Tokya, Japan

[73] Assignee: NEC Corporation, Tokyo, Japan

[21] Appl. No.: 09/265,556

[22] Filed: Mar. 9, 1999

[30] Foreign Application Priority Data

Mar. 17, 1998 [JP] Japan ................................. 10-067199

[51] Int. Cl.[7] ...................................................... H01S 3/00
[52] U.S. Cl. .......................................... 359/341; 359/124
[58] Field of Search ................................... 359/341, 124, 359/161, 337, 344

[56] References Cited

U.S. PATENT DOCUMENTS

| | | | |
|---|---|---|---|
| 5,056,096 | 10/1991 | Baker et al. ................................. | 372/6 |
| 5,673,141 | 9/1997 | Gambini .................................... | 359/341 |
| 6,043,931 | 3/2000 | Jourdan et al. ........................... | 359/341 |
| 6,058,128 | 5/2000 | Ventrudo .................................... | 372/96 |

*Primary Examiner*—Mark Hellner
*Attorney, Agent, or Firm*—McGinn & Gibb, P.C.

[57] ABSTRACT

An optically amplifying device with a gain equalizing function comprises: an optical fiber amplifier for receiving, as an input, a wavelength division multiplexed signal light beam which has been obtained by wavelength-division multiplexing a plurality of signal light beams having different wavelengths to output the amplified signal light beam containing the plurality of signal light beams, which is obtained by optically amplifying the wavelength division multiplexed signal light beam; and a gain equalizer for receiving, as an input, the amplified signal light beam to optically amplify the plurality of signal light beams thus amplified to equalize the optical output levels thereof, thereby outputting the equalized amplified signal light beams. The gain equalizer includes a semiconductor optical amplifier, the gain for each of the plurality of signal light beams of the semiconductor optical amplifier is set in a way that when the gain for each of the plurality of signal light beams of the semiconductor optical amplifier is superimposed on the gain for each of the plurality of signal light beams of the optical fiber amplifier, the gain difference between the signal light beam is cancelled out. The gain equalizer may be disposed either before the optical fiber amplifier or between the two optical fiber amplifiers. In the optical amplification of the wavelength division multiplexed signal light beam containing the plurality of signal light beams having different wavelengths, the optical output difference occurring between the levels of the amplified signal light beams is reduced effectively.

18 Claims, 7 Drawing Sheets

OPTICALLY AMPLIFYING DEVICE WITH GAIN EQUALIZING FUNCTION

BACKGROUND OF THE INVENTION

1. Field of the Invention

An optically amplifying device with a gain equalizing function of the present invention relates to an optically amplifying device including an optical amplifier for optically amplifying directly an input signal light beam. In particular, the present invention relates to an optically amplifying device for optically amplifying a WDM signal (a Wavelength Division Multiplexed signal) which is obtained by wavelength-division multiplexing signal light beams having a plurality of wavelengths different from one another.

2. Description of the Related Art

In a middle and long distance optical fiber communication system, there is employed an optical amplifier for amplifying a signal light beam which has been attenuated through a transmission line fiber. As the optical amplifier, there is widely used an optical fiber amplifier for amplifying directly a signal light beam with a rare-earth doped optical fiber as an amplification medium. Also, as the amplification medium of the optical fiber amplifier, the rare-earth doped optical fiber is employed. In this connection, there is generally known an FDFA (an Erbium Doped Fiber Amplifier) employing erbium elements as dopant.

On the other hand, as a system for increasing the transmission capacity without establishing more optical transmission lines, there is generally known a wavelength division multiple transmission system for wavelength-division multiplexing a plurality of signal light beams having wavelengths different from one another to optically transmit the resultant optical signal. In this wavelength division multiple optical transmission system as well, the above-mentioned optical fiber amplifier can be applied thereto.

However, if the constituent signal light beams of the wavelength division multiplexed signal light beam are intended to be optically amplified by the optical fiber amplifier, the dispersion between the gains for the constituent signal light beams due to the wavelength characteristics of the gain of the erbium doped optical fiber, i.e., the degradation of the flatness of the gains becomes a problem. Then, for the purpose of improving the gain flatness, a gain equalizer is employed.

For the conventional gain equalizer, there is employed an optical passive component having the wavelength characteristics of the loss which are set so as to cancel the waveform characteristics of the gain of the erbium doped optical fiber. This aim is such that in the case where the gain flatness can not be ensured due to the fact that as compared with the gain of a signal light beam having a certain wavelength, the gain of a signal light beam having another wavelength is lower, an optical passive component which is larger in loss than the former signal light beam is inserted and disposed in order to adjust the total gain.

However, if the gain flatness is intended to be ensured on the basis of such a construction, for example, in the case where the optical amplifier has the wavelength characteristics of the gain of 5 dB between the signal light beams of the wavelength division multiplexed signal light beam, the gain difference can not be perfectly cancelled out unless the loss of at least 5 dB is added thereto. Therefore, the loss required for the equalization becomes large, and hence finally, the optical output characteristics required for the overall optically amplifying device can not be obtained. In addition, there arises the problem that the noise degradation is increased.

SUMMARY OF THE INVENTION

In the light of the foregoing, an object of an optically amplifying device with a gain equalizing function of the present invention is to reduce a gain difference between signal light beams even when a plurality of signal light beams having wavelengths different from one another are collectively, optically amplified, thereby unifying the optical output levels between the signal light beams having the wavelengths different from one another which are contained in the amplified wavelength division multiplexed signal light beam.

In order to solve the above-mentioned problems associated with the prior art, the present invention may provide an optically amplifying device with a gain equalizing function including: an optical fiber amplifier for receiving, as an input, a wavelength division multiplexed signal light beam which has been obtained by wavelength-division multiplexing a plurality of signal light beams having wavelengths different from one another to output the amplified signal light beam containing the plurality of signal light beams, which is obtained by optically amplifying the wavelength division multiplexed signal light beam; and a gain equalizer for receiving, as an input, the amplified signal light beam to optically amplify the plurality of signal light beams thus amplified to equalize the optical output levels thereof, thereby outputting the equalized amplified signal light beams.

The gain equalizer includes a semiconductor optical amplifier and the gain, of the semiconductor optical amplifier, for each of the plurality of signal light beams is set in such a way that when the gain, of the semiconductor optical amplifier, for each of the plurality of signal light beams is superimposed on the gain for each of the plurality of signal light beams of the optical fiber amplifier, the gain difference between the signal light beams is cancelled out.

In addition, the present invention may provide an optically amplifying device with a gain equalizing function including: a gain equalizer for receiving, as an input, a wavelength division multiplexed signal light beam which has been obtained by wavelength-division multiplexing a plurality of signal light beams having wavelengths different from one another to output the equalized amplified signal light beam containing the plurality of signal light beams, which is obtained by optically amplifying the wavelength division multiplexed signal light beam; and an optical fiber amplifier for receiving, as an input, the equalized amplified signal light beams to optically amplify the equalized amplified signal light beams thus inputted thereto to output the amplified signal light beams. The gain equalizer includes a semiconductor optical amplifier and the gain for each of the plurality of signal light beams of the semiconductor optical amplifier is set in such a way that when the gain for each of the plurality of signal light beams of the semiconductor optical amplifier is superimposed on the gain for each of the plurality of signal light beams of the optical fiber amplifier, the gain difference between the signal light beams is cancelled out, whereby the optical output levels of the plurality of signal light beams which are contained in the amplified signal light beam and which have been amplified are equalized.

In addition, the present invention may provide an optically amplifying device with a gain equalizing function including: a first optical fiber amplifier for receiving, as an input, a wavelength division multiplexed signal light beam which has been obtained by wavelength-division multiplexing a plurality of signal light beams having wavelengths different from one another to output a first amplified signal light beam containing the plurality of signal light beams, which is obtained by optically amplifying the wavelength division multiplexed signal light beam; a gain equalizer for receiving, as an input, the amplified signal light beam to optically amplify the plurality of signal light beams thus amplified to equalize the optical output levels thereof, thereby outputting the equalized amplified signal light beams; and a second optical fiber amplifier for receiving, as an input, the equalized amplified signal light beams to optically amplify the equalized amplified signal light beams thus inputted thereto to output the amplified signal light beam.

In the above-mentioned construction, similarly to the foregoing, the gain equalizer includes a semiconductor optical amplifier and the setting is made in such a way that when the gain for each of the plurality of signal light beams of the semiconductor optical amplifier is superimposed on both of the gain for each of the plurality of signal light beams of the first optical fiber amplifier and the gain for each of the plurality of signal light beams of the second optical fiber amplifier, the gain difference between the signal light beams is cancelled out.

The above-mentioned optical fiber amplifier in the optically amplifying device according to the present invention includes: a rare-earth doped optical fiber as an amplification medium for amplifying the input light beam; a light source for optical pumping for outputting a pump light beam; and a WDM (a Wavelength Division Multiplexer) for inputting therethrough the pump light beam to the rare-earth doped optical fiber.

In the optically amplifying device with a gain equalizing function according to the present invention, the gain equalizer including the semiconductor optical amplifier is disposed either in the before stage or in the after stage so that the wavelength characteristics of the gain thereof cancel the wavelength characteristics of the gain of the above-mentioned optical fiber amplifier. As a result, when the wavelength division multiplexed signal light beam is amplified by the optical fiber amplifier, the difference in the optical output between the signal light beams having the different wavelengths due to the wavelength characteristics of the gain is cancelled out to equalize the gains for the signal light beams in terms of the overall optically amplifying device.

In this connection, since the semiconductor optical amplifier is employed as the gain equalizer, as compared with the conventional gain equalizer utilizing the wavelength characteristics of the loss provided by the optical passive component, the gain difference between the signal optical beams can also be reduced while ensuring the desired gain without reducing the gain of the overall optically amplifying device.

In addition, the present invention may also provide an optically amplifying device with a gain equalizing function, wherein the gain equalizer includes a semiconductor optical amplifier, and the gain for each of the plurality of signal output light beams of the semiconductor optical amplifier is set in such a way that the optical levels of the plurality of signal light beams which have been outputted from the optically amplifying device with a gain equalizing function are flattened.

BRIEF DESCRIPTION OF THE DRAWINGS

The above and other objects, features and advantages of the present invention will become more apparent from the following detailed description when taken in conjunction with the accompanying drawings, wherein.

DETAILED DESCRIPTION OF THE PREFERRED EMBODIMENTS

The preferred embodiments of a gain equalizer and an optically amplifying device with a gain equalizing function employing the same according to the present invention will hereinafter be described in detail with reference to the accompanying drawings.

Figure 1:
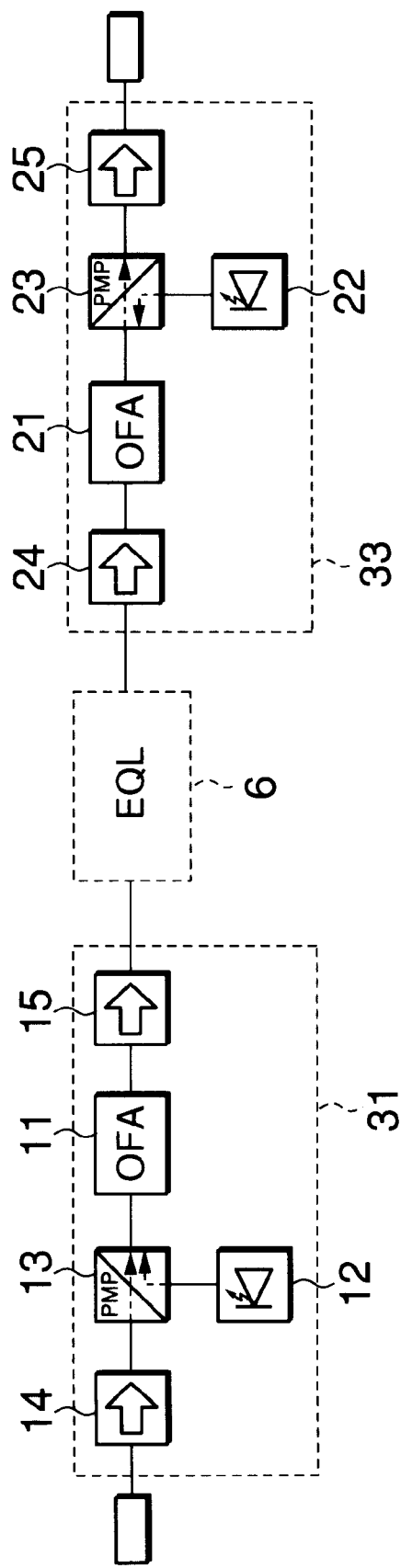
FIG. 1 is a block diagram showing a configuration of a first embodiment of an optically amplifying device with a gain equalizing function according to the present invention.

FIG. 1 is a block diagram showing a configuration of a first embodiment of an optically amplifying device with a gain equalizing function according to the present invention.

In the present embodiment, a first and second optical fiber amplifiers 31 and 32 are employed. A gain equalizer 41 is disposed between the first and second optical fiber amplifiers 31 and 32. The first and second optical fiber amplifiers 31 and 32 are respectively provided with erbium doped optical fibers 11 and 21 as the amplification media, and also light sources for optical pumping 12 and 22 for outputting pump light beams.

The pump light beams are optically synthesized with the signal light beams which are inputted by optically synthesizing units 13 or 23 to be made incident onto the erbium doped fibers, respectively. In order for the operation of the optical fiber amplifiers not to be unstable due to the return light, optical isolators 14, 15 or 24, 25 are disposed on both of the input side and the output side of the optical fiber amplifiers, respectively.

In the present embodiment, the signal light beam has the wavelength of the band of 1,550 nm, and also the forward optical pumping method of making the pump light beam incident from the forward side is adopted. In the first optical fiber amplifier 31 disposed in the before stage, the optically synthesizing unit 13 is disposed in the before stage of the erbium doped optical fiber. The pump light beam has the wavelength of the band of 980 nm, and the signal light beam is optically amplified with low noise. On the other hand, in the second optical fiber amplifier 32 disposed in the after stage, the optically synthesizing unit 23 is disposed in the after stage of the erbium doped optical fiber, and also the backward optical pumping method of making the pump light beam incident from the backward side is adopted. The pump light beam has the wavelength of the band of 1,480 nm, and the signal light beam is optically amplified at high efficiency. In this connection, the wavelength of the pump light beam of the light source in the after stage may be the same as that of the pump light beam of the light source in the before stage, or alternatively, the former and the latter may be replaced with each other.

Next, the description will hereinbelow be given with respect to a gain equalizer for use in the present invention.

Figure 2:
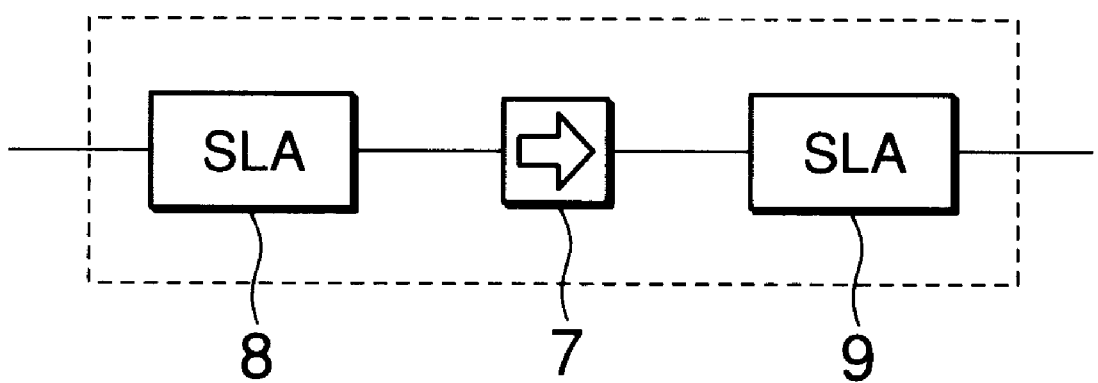
FIG. 2 is a block diagram showing a configuration of a gain equalizer for use in an optically amplifying device with a gain equalizing function according to the present invention.
Figure 3:
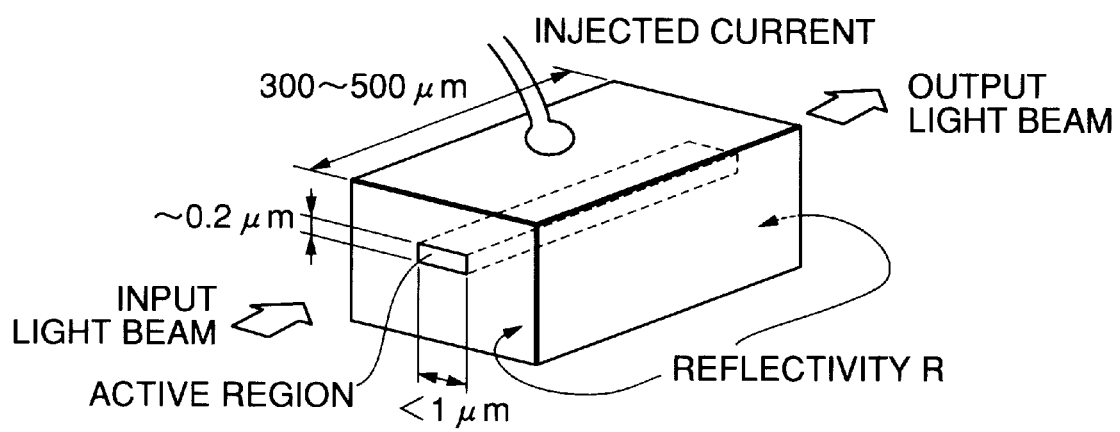
FIG. 3 is a perspective view showing the construction of an example of a semiconductor optical amplifier constituting a gain equalizer for use in an optically amplifying device according to the present invention.

FIG. 2 is a block diagram showing a basic configuration of a gain equalizer for use in the optically amplifying device with a gain equalizing function according to the present invention. In this case, for example, a semiconductor optical amplifier as shown in FIG. 3 constitutes the gain equalizer. In order that the operation of the semiconductor optical amplifiers may be prevented from becoming unstable due to the return light, an optical isolator 7 is disposed between semiconductor optical amplifiers 8 and 9.

In the semiconductor optical amplifier, the wavelength dependency of the gain can be varied on the basis of the end face reflectivities of both of the end faces of the chip of the semiconductor device. Therefore, the semiconductor optical amplifiers may be provided with the wavelength dependency in such a way that the difference between the gains for the signal light beams having the different wavelengths which are obtained by the above-mentioned two optical fiber amplifiers 31 and 32 can be cancelled out.

More specifically, the wavelength band of the used signal light beam and the wavelength characteristics of the optical fiber amplifier in such a wavelength band are taken into consideration and also on the basis of the following characteristics of the semiconductor optical amplifier, the length of an active layer, the end face reflectivities and the like may be determined.

Now, if the ideal case is assumed and hence the residual reflectivity is disregarded, then the gain Gs which is obtained by the signal light beam is expressed by the following equation.

$$Gs = \exp((\Gamma g - \alpha)L) \quad (1)$$

where $\Gamma$ is the optical confinement coefficient, L is the active layer length, $\alpha$ is the absorption coefficient, and g is the gain coefficient.

Since in actual, there is the residual reflectivities of the end faces, if the resonance effect provided thereby is taken into consideration, the gain Gc is expressed by the following equation.

$$Gc = \frac{(1-R_1)(1-R_2)Gs}{(1-(R_1 \cdot R_2)^{1/2}Gs)^2 + 4(R_1+R_2)^{1/2}Gs \cdot \sin^2\phi}$$

where R1 and R2 are the end face reflectivities, and $\phi$ is the phase difference between the signal light beams at the input and output ends.

Next, if obtaining the ratio of the gain when the phase difference is maximum to the gain when the phase difference is minimum, then the depth m of the ripple of the gain is obtained on the basis of the following equation.

$$m = \frac{1+(R_1 \cdot R_2)^{1/2}Gs}{1-(R_1 \cdot R_2)^{1/2}Gs}$$

In other words, by setting suitably the end face reflectivities R1 and R2, and the gain which is determined on the basis of Expression (1), the depth of the ripple can be determined.

When $R_1=R_2=0.1\%$ and Gs is 25 dB, the depth m of the ripple of the gain can be set near 3 dB. Therefore, the wavelength characteristics of the gains of the optical fiber amplifiers are cancelled out by setting suitably the end face reflectivities of the semiconductor optical amplifiers on the basis of Expressions (1) to (3) to generate the ripples in such a way that the wavelength characteristics of the gains of the optical fiber amplifiers become opposite to each other, and as a result the gains for the constituent signal light beams can be equalized in terms of the overall optically amplifying device.

While in the present embodiment, the description has been given with respect to the specific case where the two semiconductor optical amplifiers are employed, it is to be understood that one semiconductor optical amplifier may be available or alternatively three or more semiconductor optical amplifiers may also be available.

Next, the operation of the first embodiment of the optically amplifying device with a gain equalizing function, shown in FIG. 1, according to the present invention will hereinbelow be described in more detail with reference to the wavelength characteristics of the gains and the situation of the signal light beams.

Figure 4:
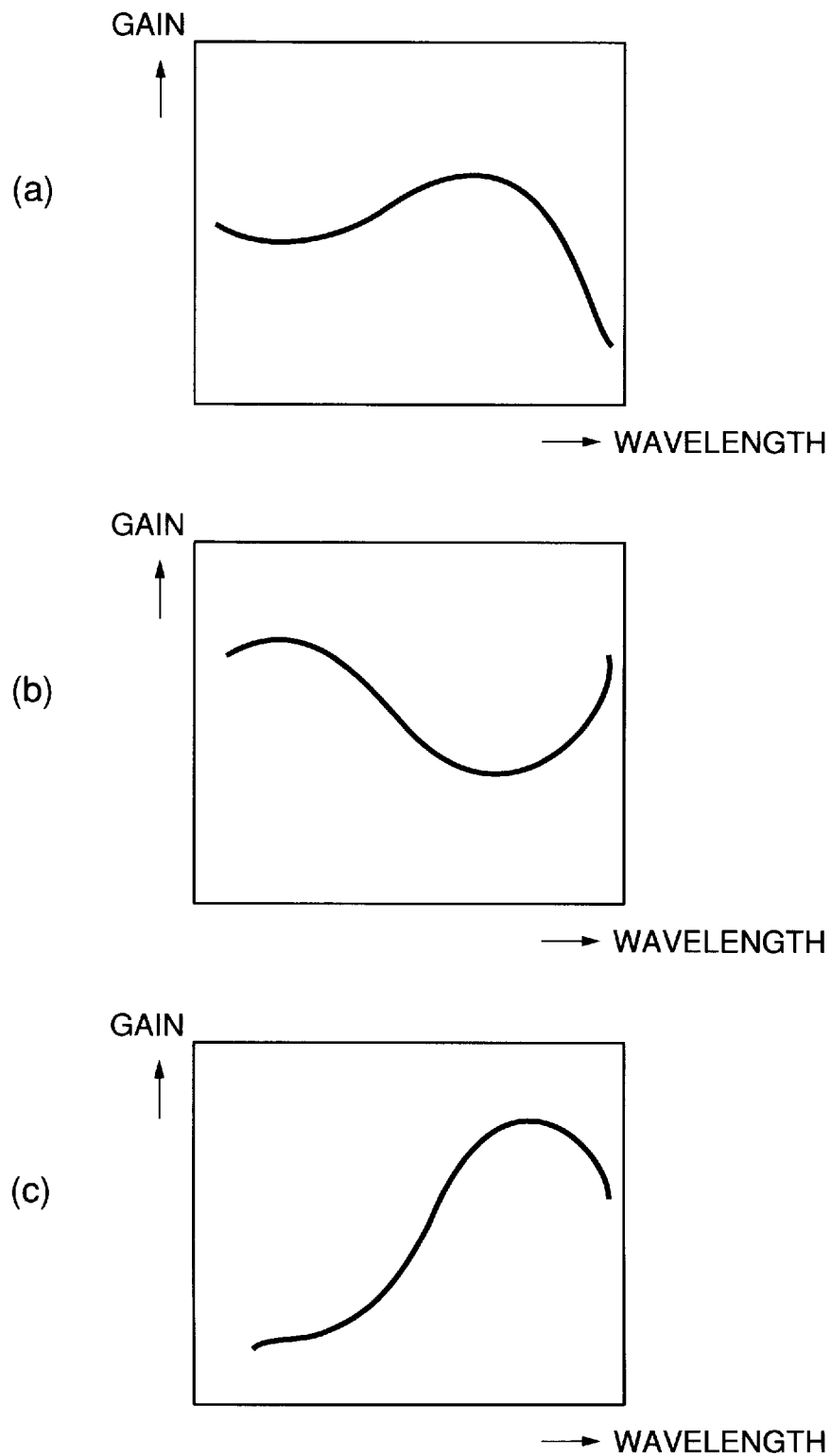
FIG. 4 is a diagram showing the wavelength characteristics of the gains of optical fiber amplifiers and a gain equalizer useful in explaining the principles of operation of an optically amplifying device with a gain equalizing function according to the present invention, and a part (a) is a graphical representation showing the wavelength characteristics of the gain of a first optical fiber amplifier, a part (b) is a graphical representation showing the wavelength characteristics of the gain of a gain equalizer and a part (c) is a graphical representation showing the wavelength characteristics of the gain of a second optical fiber amplifier.

FIG. 4 is a diagram showing the wavelength characteristics of the gains of the optical fiber amplifiers and the gain equalizer useful in explaining the principles of operation of the optically amplifying device with a gain equalizing function according to the present invention, and a part (a) is a graphical representation showing the wavelength characteristics of the gain of the first optical fiber amplifier, a part (b) is a graphical representation showing the wavelength characteristics of the gain of the gain equalizer and a part (c) is a graphical representation showing the wavelength characteristics of the gain of the second optical fiber amplifier.

Figure 5:
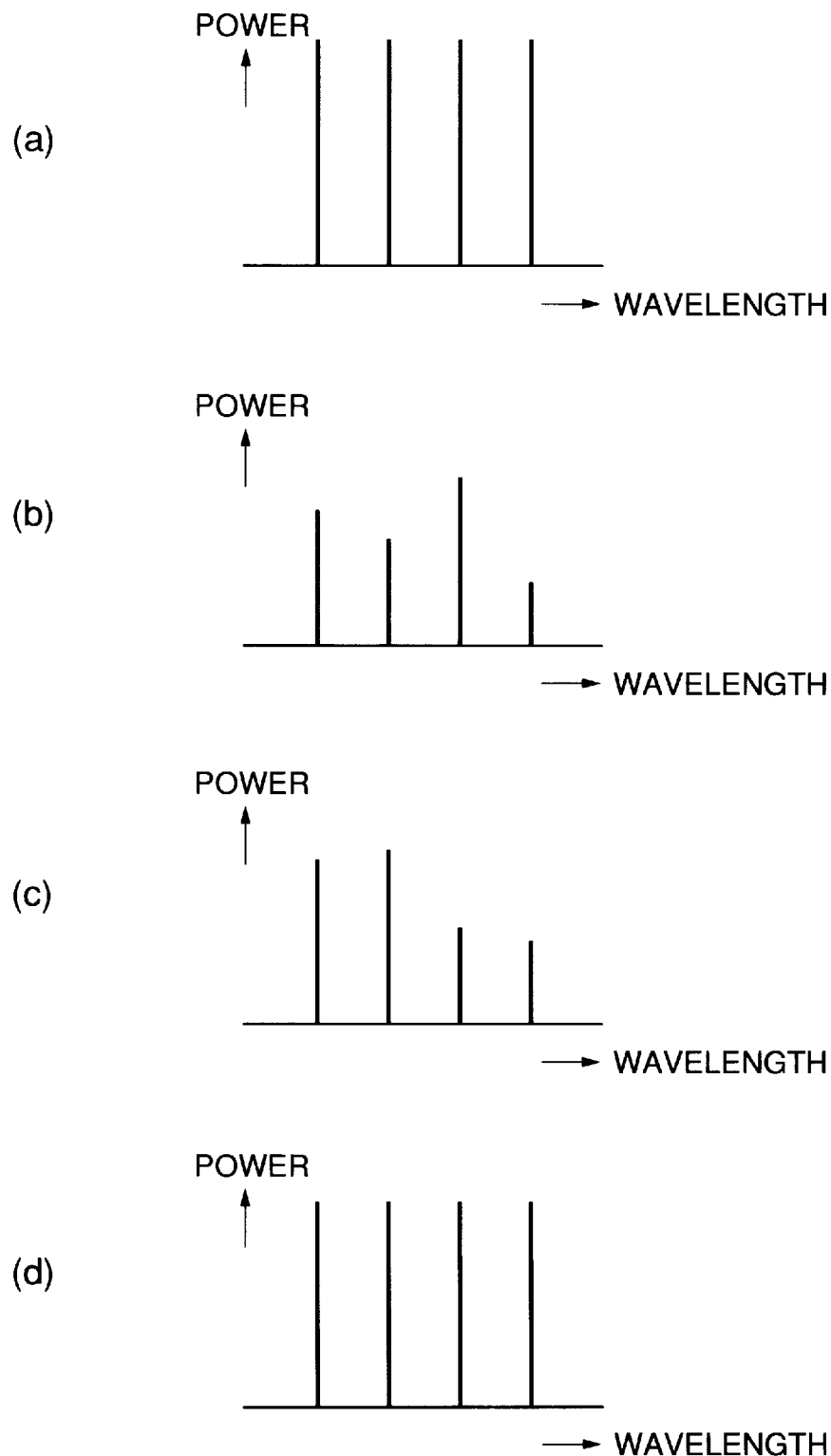
FIG. 5 is a diagram showing the state of an optical output of a wavelength division multiplexed signal light beam useful in explaining the principles of operation of an optically amplifying device with a gain equalizing function according to the present invention, and a part (a) is a spectrum diagram showing schematically an optical output of an input signal light beam to an optically amplifying device, a part (b) is a spectrum diagram showing schematically an optical output of a signal light beam which is amplified by a first optical fiber amplifier to be outputted, a part (c) is a spectrum diagram showing schematically an optical output of a signal light beam which is amplified by a gain equalizer to be outputted, and a part (d) is a spectrum diagram showing schematically an optical output of a signal light beam which is amplified by the overall optically amplifying device to be outputted.

FIG. 5 is a diagram showing the state of the optical output of the wavelength division multiplexed signal light beam useful in explaining the principles of operation of the optically amplifying device with a gain equalizing function according to the present invention, and a part (a) is a spectrum diagram showing schematically the optical output of the input signal light beam to the optically amplifying device, a part (b) is a spectrum diagram showing schematically the optical output of the signal light beam which is amplified by the first optical fiber amplifier to be outputted, a part (c) is a spectrum diagram showing schematically the optical output of the signal light beam which is amplified by the gain equalizer to be outputted, and a part (d) is a spectrum diagram showing schematically the optical output of the signal light beam which is amplified by the overall optically amplifying device to be outputted.

As shown in the part (a) of FIG. 5, when the constituent signal light beams of the wavelength division multiplexed signal light beam have been inputted in which no dispersion is present in the optical output levels having the different wavelengths, first of all, those light beams are collectively, optically amplified by the first optical fiber amplifier 31. However, as shown in the part (b) of FIG. 4, in general, the gain of the optical fiber amplifier has the wavelength dependency, and hence the gain varies depending on the wavelength of the inputted signal light beam. As a result, even if the signal light beams having the same optical output level are inputted, as shown in the part (b) of FIG. 5, the dispersion occurs between the optical output levels.

Next, with the wavelength division multiplexed signal light beam thus amplified, the constituent signal light beams contained therein are collectively amplified by the gain equalizer 6 which is disposed in the more after stage. In this connection, as shown in the part (b) of FIG. 4, the wavelength characteristics of the gain which the gain equalizer 6 has is substantially opposite to the wavelength characteristics of the gain of the optical fiber amplifier as shown in the part (a) and the part (c) of FIG. 4, i.e., when both of the wavelength characteristics are superimposed on each other, the gain difference is cancelled out and the optical outputs of the signal light beams are flattened in level. Such wavelength characteristics of the gain can be made the desired wavelength characteristics by measuring previously the wavelength characteristics of the optical fiber amplifier and by changing, in correspondence thereto, the reflectivities of the forward and backward end faces of the chip of the semiconductor optical amplifier utilizing the method as described above.

The part (c) of FIG. 5 is a spectrum diagram showing the optical output levels of the constituent signal light beams contained in the wavelength division multiplexed signal light beam which is further optically amplified by the gain equalizer 6. Though the dispersion is present between the optical output levels of the constituent signal light beams, the constituent signal light beams are collectively, optically amplified by the second optical fiber amplifier 32 which is disposed in the more after stage. Therefore, the dispersion is previously provided so as to have the opposite wavelength characteristics in such a way that the dispersion which occurs at that time can be corrected.

The part (c) of FIG. 4 is a spectrum diagram showing the wavelength characteristics of the gain of the second optical fiber amplifier 32. Then, when the wavelength division multiplexed signal light beam which has the dispersion shown in the part (c) of FIG. 5 has been inputted to the second fiber amplifier 32 to be optically amplified therein to be outputted therefrom, the constituent signal light beams are outputted which have no dispersion between the optical output levels and in which the flatness of the optical output levels is maintained as shown in the part (d) of FIG. 5.

Next, the description will hereinbelow be given with respect to other embodiments of an optically amplifying device with a gain equalizing function according to the present invention.

Figure 6:
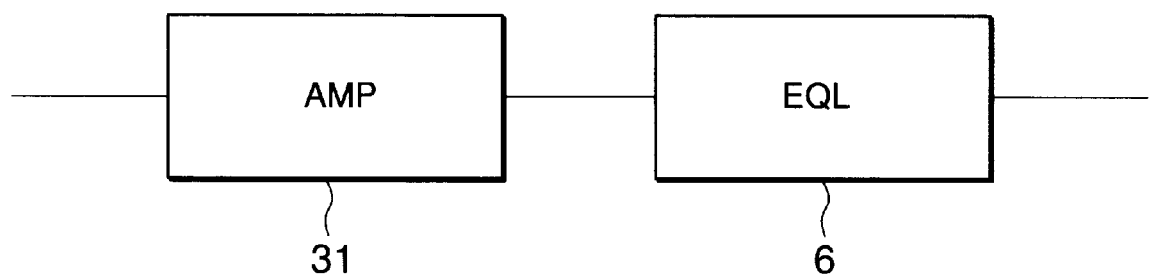
FIG. 6 is a block diagram showing a configuration of a second embodiment of an optically amplifying device with a gain equalizing function according to the present invention.
Figure 7:
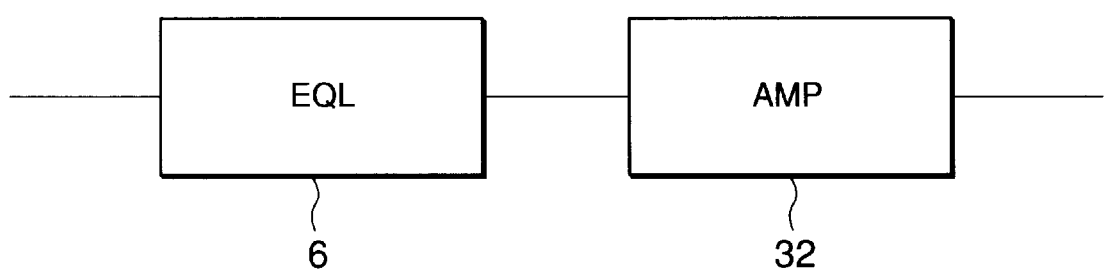
FIG. 7 is a block diagram showing a configuration of a third embodiment of an optically amplifying device with a gain equalizing function according to the present invention.

FIGS. 6 and 7 are respectively block diagrams showing configurations of other embodiments of an optically amplifying device with a gain equalizing function according to the present invention. In a second embodiment of an optically amplifying device with a gain equalizing function according to the present invention shown in FIG. 6, the configuration thereof is different from that of the first embodiment shown in FIG. 1. That is, in the second embodiment shown in FIG. 6, the second fiber amplifier 32 in the after stage shown in FIG. 1 is removed, and hence the optically amplifying device is constituted by only the first optical fiber amplifier 31 and the gain equalizer 6 shown in FIG. 1. In the configuration of the present embodiment, while the optical output characteristics thereof are not so excellent as in the first embodiment since the optical output characteristics of the semiconductor optical amplifier become directly the optical output characteristics of the optically amplifying device, the second embodiment has the configuration simpler than that of the first embodiment.

On the other hand, in a third embodiment of an optically amplifying device with a gain equalizing function according to the present invention shown in FIG. 7, unlike the second embodiment shown in FIG. 6, in contrast therewith, the first optical fiber amplifier 31 in the before stage shown in FIG. 1 is removed, and hence the optically amplifying device is constituted by only the second optical fiber amplifier 32 and the gain equalizer 6 shown in FIG. 1. In the configuration of the present embodiment, while the noise characteristics thereof are worse than those of the first embodiment or the like since the noise characteristics of the semiconductor optical amplifier exert a large influence on the noise characteristics of the optically amplifying device, the present embodiment can be more simply configured than the first embodiment.

Incidentally, while the description has been given by taking an example the erbium doped optical fiber, it is to be understood that the present invention can also be applied to an optical fiber amplifier having as an amplification medium an optical fiber which is doped with any other rare earth elements.

In the present embodiment, there is assumed the specific case where the difference occurs between the optical output levels of the constituent signal light beams having the different wavelengths due to only the wavelength characteristics of the gain of the optical fiber amplifier. However, in the case where the difference occurs between the original optical outputs of the light sources for the signal light beams having the different wavelengths, or even in the case where the difference occurs between the optical output levels due to the wavelength dependency of the transmission loss of the optical transmission line, by changing the end face reflectivities of the gain equalizer which is employed in the present invention, the levels of the optical outputs can be flattened.

As set forth hereinabove, in an optically amplifying device with a gain equalizing function according to the present invention, a gain equalizer including a semiconductor optical amplifier is disposed either in the before stage or in the after stage, and the wavelength characteristics of the gain thereof are cancelled with the wavelength characteristics of the gain of an optical fiber amplifier. As a result, when a wavelength division multiplexed signal light beam is optically amplified by the optical fiber amplifier, the difference between the optical output levels of the constituent signal light beams having different wavelengths due to the wavelength characteristics of the gain is cancelled to provide the constituent signal light beams with the equalized gains in terms of the overall optically amplifying device.

Since a semiconductor optical amplifier is employed so as to constitute the gain equalizer, as compared with the case where the wavelength characteristics of the loss due to a conventional optical passive component are utilized, the gain difference between the constituent signal light beams can also be reduced while ensuring the desired gain without reducing the gain of the overall optically amplifying device. As a result, even when the constituent signal light beams of the wavelength division multiplexed signal light beam are collectively, optically amplified, the optical output levels of the constituent signal light beams thus amplified can be flattened, this enables the wavelength division multiple optical transmission to be stably carried out.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optically amplifying device with a gain equalizing function comprising: an optical fiber amplifier for receiving, as an input, a wavelength division multiplexed signal light beam which has been obtained by wavelength-division multiplexing a plurality of signal light beams having wavelengths different from one another to output the amplified signal light beam containing the plurality of signal light beams, which is obtained by optically amplifying the wavelength division multiplexed signal light beam; and a gain equalizer for receiving, as an input, the amplified signal light beam to optically amplify the plurality of signal light beams thus amplified to equalize the optical output levels thereof, thereby outputting the equalized amplified signal light beams, wherein said gain equalizer includes a semiconductor optical amplifier and the gain for each of the plurality of signal light beams of said semiconductor optical amplifier is set in such a way that when the gain for each of the plurality of signal light beams of said semiconductor optical amplifier is superimposed on the gain for each of the plurality of signal light beams of said optical fiber amplifier, the gain difference between the signal light beams is cancelled out.

2. An optically amplifying device with a gain equalizing function according to claim 1, wherein said gain equalizer includes a semiconductor optical amplifier, and the gain for each of the plurality of signal output light beams of said semiconductor optical amplifier is set in such a way that the optical levels of the plurality of signal light beams which have been outputted from said optically amplifying device with a gain equalizing function are flattened.

3. An optically amplifying device with a gain equalizing function comprising: a gain equalizer for receiving, as an input, a wavelength division multiplexed signal light beam which has been obtained by wavelength-division multiplexing a plurality of signal light beams having wavelengths different from one another to output the equalized amplified signal light beam containing the plurality of signal light beams, which is obtained by optically amplifying the wavelength division multiplexed signal light beam; and an optical fiber amplifier for receiving, as an input, the equalized amplified signal light beams to optically amplify the equalized amplified signal light beams thus inputted thereto to output the amplified signal light beams, wherein said gain equalizer includes a semiconductor optical amplifier and the gain for each of the plurality of signal light beams of said semiconductor optical amplifier is set in such a way that when the gain for each of the plurality of signal light beams of said semiconductor optical amplifier is superimposed on th the gain for each of the plurality of signal light beams of said optical fiber amplifier, the gain difference between the signal light beams is cancelled out, whereby the optical output levels of the plurality of signal light beams which are contained in the amplified signal light beam and which have been amplified are equalized.

4. An optically amplifying device with a gain equalizing function according to claim 3, wherein said gain equalizer includes a semiconductor optical amplifier, and the gain for each of the plurality of signal output light beams of said semiconductor optical amplifier is set in such a way that the optical levels of the plurality of signal light beams which have been outputted from said optically amplifying device with a gain equalizing function are flattened.

5. An optically amplifying device with a gain equalizing function comprising: a first optical fiber amplifier for for receiving, as an input, a wavelength division multiplexed signal light beam which has been obtained by wavelength-division multiplexing a plurality of signal light beams having wavelengths different from one another to output a first amplified signal light beam containing the plurality of signal light beams, which is obtained by optically amplifying the wavelength division multiplexed signal light beam; a gain equalizer for receiving, as an input, the amplified signal light beam to optically amplify the plurality of signal light beams thus amplified to equalize the optical output levels thereof, thereby outputting the equalized amplified signal light beams; and a second optical fiber amplifier for receiving, as an input, the equalized amplified signal light beams to optically amplify the equalized amplified signal light beams thus inputted thereto to output the amplified signal light beam, wherein said gain equalizer includes a semiconductor optical amplifier and the setting is made in such a way that when the gain for each of the plurality of signal light beams of said semiconductor optical amplifier is superimposed on both of the gain for each of the plurality of signal light beams of said first optical fiber amplifier and the gain for each of the plurality of signal light beams of said second optical fiber amplifier, the gain difference between the signal light beams is cancelled out.

6. An optically amplifying device with a gain equalizing function according to claim 5, wherein said gain equalizer includes a semiconductor optical amplifier, and the gain for each of the plurality of signal output light beams of said semiconductor optical amplifier is set in such a way that the optical levels of the plurality of signal light beams which have been outputted from said optically amplifying device with a gain equalizing function are flattened.

7. An optically amplifying device with a gain equalizing function according to claim 1, wherein said optical fiber amplifier comprises:

a rare-earth doped optical fiber, as an amplification medium, for optically amplifying the inputted light beam;

a light source for optical pumping for outputting a pump light beam; and an optically synthesizing unit for inputting therethrough the pump light beam to said rare-earth doped optical film.

8. An optically amplifying device with a gain equalizing function according to claim 7, wherein said rare-earth doped optical fiber is an erbium doped optical fiber.

9. An optically amplifying device with a gain equalizing function according to claim 7, wherein said gain equalizer comprises at least one semiconductor optical amplifier.

10. An optically amplifying device with a gain equalizing function according to claim 8, wherein said gain equalizer comprises:
- a first semiconductor optical amplifier;
- a second semiconductor optical amplifier; and
- an optical isolator disposed between said first and second semiconductor optical amplifiers.

11. An optically amplifying device with a gain equalizing function according to claim 3, wherein said optical fiber amplifier comprises:
- a rare-earth doped optical fiber, as an amplification medium, for optically amplifying the inputted light beam;
- a light source for optical pumping for outputting a pump light beam; and
- an optically synthesizing unit for inputting therethrough the pump light beam to said rare-earth doped optical film.

12. An optically amplifying device with a gain equalizing function according to claim 10, wherein said rare-earth doped optical fiber is an erbium doped optical fiber.

13. An optically amplifying device with a gain equalizing function according to claim 11, wherein said gain equalizer comprises at least one semiconductor optical amplifier.

14. An optically amplifying device with a gain equalizing function according to claim 11, wherein said gain equalizer comprises:
- a first semiconductor optical amplifier;
- a second semiconductor optical amplifier; and
- an optical isolator disposed between said first and second semiconductor optical amplifiers.

15. An optically amplifying device with a gain equalizing function according to claim 5, wherein said optical fiber amplifier comprises:
- a rare-earth doped optical fiber, as an amplification medium, for optically amplifying the inputted light beam;
- a light source for optical pumping for outputting a pump light beam; and
- an optically synthesizing unit for inputting therethrough the pump light beam to said rare-earth doped optical film.

16. An optically amplifying device with a gain equalizing function according to claim 15, wherein said rare-earth doped optical fiber is an erbium doped optical fiber.

17. An optically amplifying device with a gain equalizing function according to claim 15, wherein said gain equalizer comprises at least one semiconductor optical amplifier.

18. An optically amplifying device with a gain equalizing function according to claim 15, wherein said gain equalizer comprises:
- a first semiconductor optical amplifier;
- a second semiconductor optical amplifier; and
- an optical isolator disposed between said first and second semiconductor optical amplifiers.

* * * * *